June 29, 1937.  A. S. BORBA ET AL  2,085,000
REAR VIEW MIRROR STRUCTURE
Original Filed Oct. 17, 1934   3 Sheets-Sheet 1

Inventor
Antone S. Borba
George T. Edwards
By Clarence A. O'Brien
Attorney

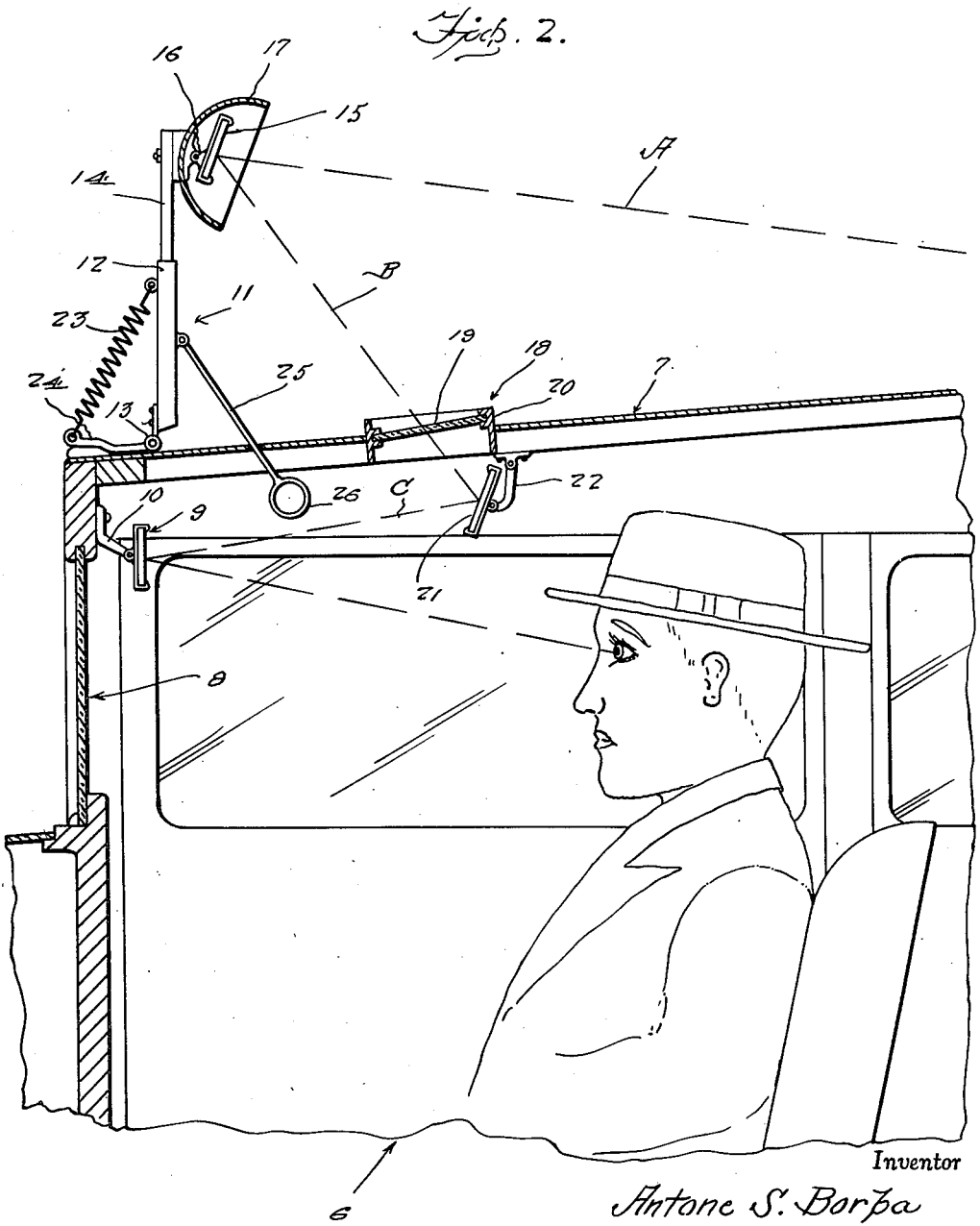

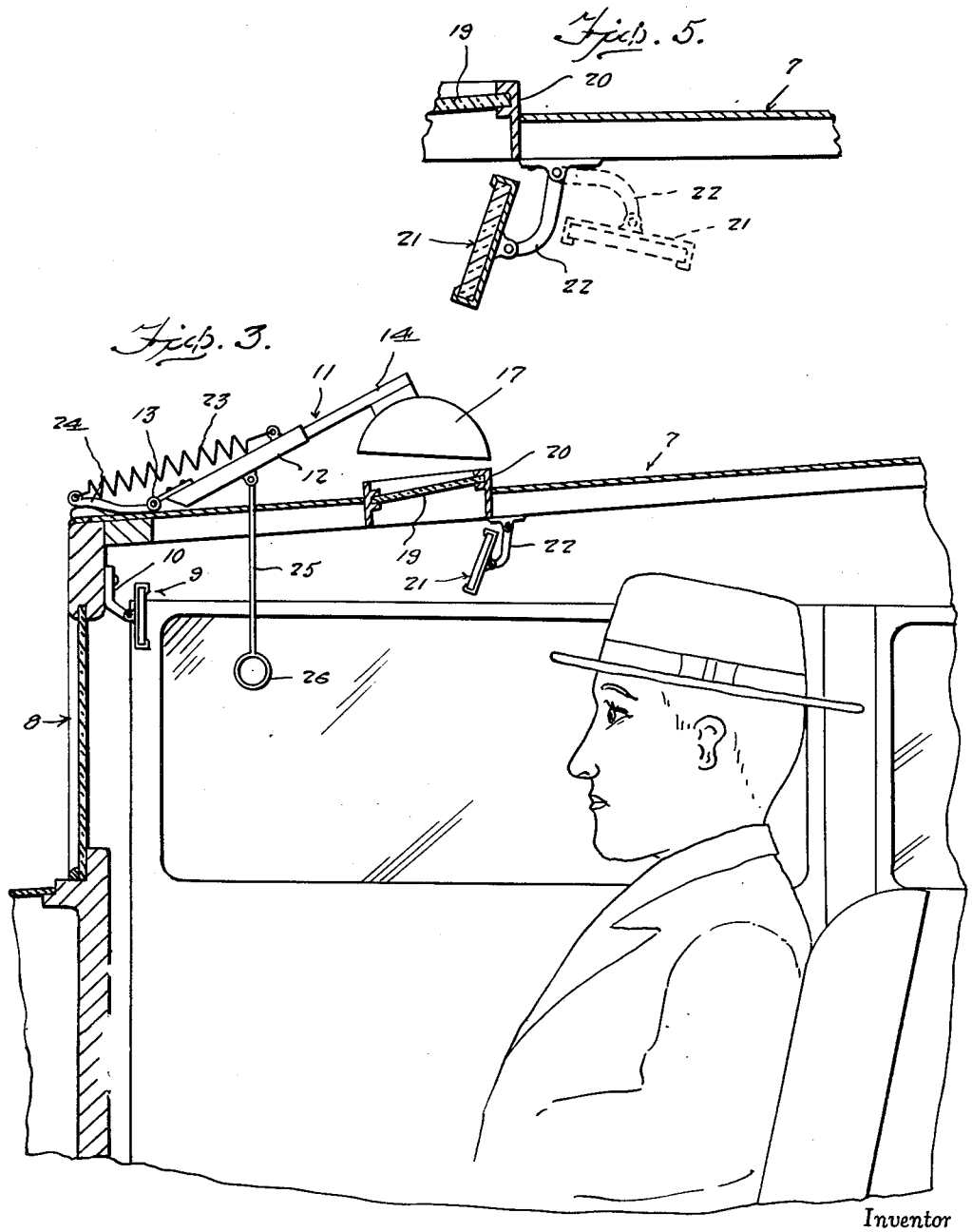

Patented June 29, 1937

2,085,000

UNITED STATES PATENT OFFICE 2,085,000

REAR VIEW MIRROR STRUCTURE

Antone S. Borba and George T. Edwards, Santa Cruz, Calif.; said Edwards assignor to Harry J. Bias, Santa Cruz, Calif.

Application October 17, 1934, Serial No. 748,738
Renewed September 16, 1936

2 Claims. (Cl. 88—86)

This invention relates to rear view mirror constructions for automobiles and the like and has more particular reference to an improved system of cooperable mirrors constructed and arranged to afford the driver of the automobile a more satisfactory and dependable picture of the traffic conditions to the rear of his machine so as to promote safe driving.

Needless to say, we are aware of the fact that the prior art to which the invention relates embodies a plurality of different type mirror arrangements and assemblies and using this knowledge as a guide, we have evolved and produced an ingenious adaptation and coordination of mirrors and complemental means which, as a unitary structure, is believed to be a novel contribution to the art and trade susceptible of being accepted and endorsed as a reliable and safe-driving mirror ensemble.

Comparing our improved and refined structure with similar prior art devices, it will be observed that our underlying thought and basic idea has to do with a mirror structure which is capable, because of its externally arranged features, of providing a more satisfactory range of vision calculated to permit traffic conditions in the rear to be adequately observed to definitely aid in the promotion of more careful and safe vehicle operation.

Other features and advantages, as well as the structure utilized will become more readily apparent from the following description and drawings.

In the accompanying drawings wherein like numerals are employed to designate like parts throughout the same:

Figure 2 is an enlarged view partly in section, and partly in elevation disclosing the relative position and coordination of mirrors and complemental parts constituting the complete operative mirror structure.

Figure 3 is a view similar to Figure 2 showing the primary or external mirror and its carrier bracket swung down to an out-of-the-way position.

Figure 5 is a fragmentary detail sectional and elevational view showing the secondary mirror located on the interior of the top of the vehicle just beneath the complemental window.

Figure 1:
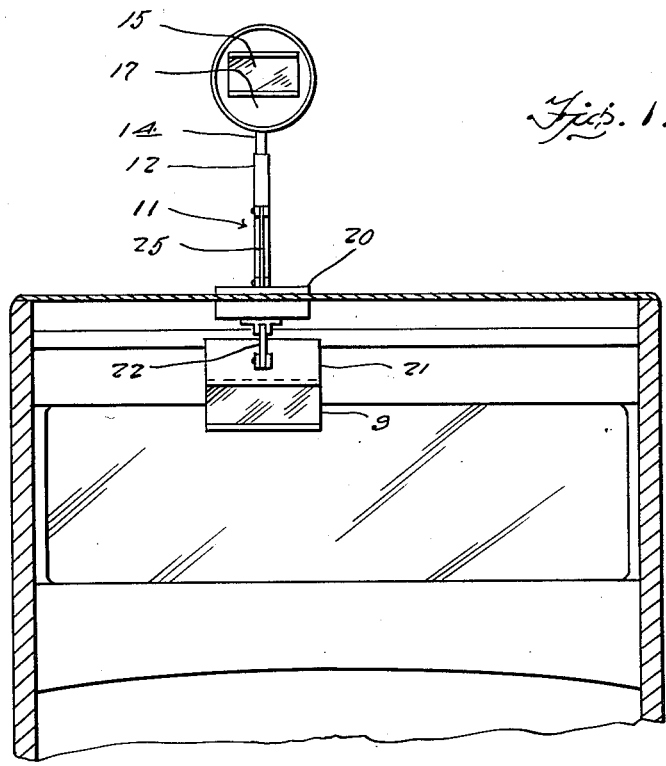
Figure 1 is a rear elevational view of the principal parts of the mirror assemblage showing the manner in which the parts cooperate with the complemental features or portions of the automobile.
Figure 4:
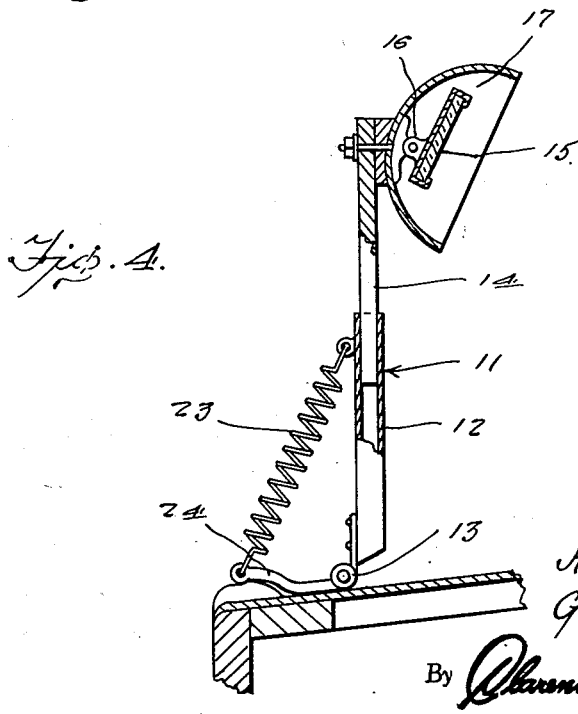
Figure 4 is a view in section and elevation showing the detailed construction of the adjustable and foldable external mirror unit.

Inasmuch as Figure 2 serves to illustrate the general assemblage and coordination of parts, it will be referred to first as a means to portray the construction and allocation of complemental parts. To begin with, the motor vehicle, which is conventional, is denoted by the numeral 6 and the roof or top is distinguished by the numeral 7. The windshield is indicated at 8 and associated with this is the customary rear view mirror 9 mounted on a suitable attaching bracket 10.

In order to convey the images and objects from the exterior of the vehicle to this main reflector mirror 9 two additional mirrors of a similar type are utilized. The primary pick-up mirror unit is located totally on the exterior of the vehicle above the roof or top. This may be said to include a supporting bracket 11. This bracket embodies a tubular section 12 hingedly attached to the vehicle top as at 13. An extensible rod 14 is telescopically mounted in this tube and fashioned at its upper end to accommodate what may be distinguished as the pick-up mirror. This mirror is of any appropriate construction and proportions and is denoted by the numeral 15. Mirror 15 is adjustably connected through the instrumentality of a bracket 16 to the central portion of a substantially semi-spherical shield 17 which is rigidly attached to the extensible rod 14. This shield may be internally constructed to function as a reflector but it is primarily utilized as a weather guard and therefore is sufficiently large to house the companion mirror 15. The shield is attached at an angle to the adjustable rod and the mirror on the interior thereof is positioned so as to receive images and objects on the line of incidence A. This therefore allows the same objects and images to be reflected angularly downward on the diverging line of reflection B. Under this arrangement, it is necessary to provide means in the top 7 to allow the reflections to be carried to the interior of the car and this is accomplished by way of a window 18. The window comprises a transparent disk or glass 19 of appropriate proportions mounted in an adapter ring or annulus 20 which is, in turn, attached to the top 7. This window is disposed at a slight angle, as illustrated in the drawings, for effective operation.

Underneath the window and on the interior of the car is a third mirror 21 hingedly attached to a swingable hanger bracket 22. This allows the mirror to be swung to an out-of-the-way position when not in use as illustrated by dotted line in Figure 5 or to be swung down to the full line position and inclined for disposition beneath the window. In the latter position, shown in Figure 2, it serves to receive the reflected images and to again reflect them forwardly on the line C for reception on the main windshield or rear view mirror 9. Here the scene thus transmitted on the lines A, B, and C can be readily observed by the operator in the car.

We call attention at this time to a coiled spring 23 which is attached to the hinged bracket or post 11 so as to maintain it normally in a perpendicular operative position. This spring is anchored on an anchoring bracket 24 attached externally to the roof of the car just above the windshield. In addition to this, we call attention to a regulator wire or rod 25 which is pivotally attached to the bracket and which extends down through an opening in the roof and is formed on its inner end with a finger ring 26 conveniently located to permit it to be grasped by the operator of the car so as to permit the entire bracket 11 and associated parts to be swung down to the out-of-the-way position shown in Figure 3. This is for bridge and overhead clearance. That is to say, under certain conditions, it may become necessary to either throw the external unit out of use temporarily or to swing it down to the position shown in Figure 3 so as to insure safe passage beneath overhead bridges and the like.

Briefly stated, it will be observed that the structure embodies a combination of the main rear view mirror 9 on the windshield in the usual place and an externally disposed mirror 15 with supporting and adjusting means therefor, a window in the roof, and a third mirror on the interior of the car just beneath the window. This allocation of mirrors enables them to function collectively to pick up the rear traffic scenery and to reflect it by way of the lines indicated to the rear view mirror 9.

It is believed that by having the rear view mirror unit above the top of the car and on the exterior, it can be adequately positioned to satisfactorily pick up images and objects over a wider range not capable with the present-day single mirror arrangements. As a matter of fact, practice has shown that a structure thus made and assembled will enable the operator of the car to visualize objects for as far as one-half mile behind when driving on a straight highway. Consequently, the range of utility of the mirror structure is enhanced and multiplied to insure more effective results and consequent safe and sane driving.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice, if desired.

What is claimed is:

1. In a structure of the class described in combination, an automobile, a mirror unit comprising a bracket including a tubular section hingedly attached to the automobile top, a slidable rod section telescopically mounted in said tubular section, a semi-spherical shield attached to the upper end of said rod section, a mirror adjustably mounted in said shield, spring means associated with said bracket to hold it normally in a vertical operative position, and to allow it to be swung down adjacent to the automobile top in an out-of-the-way position when not in use, and an operating rod connected to said bracket and extending down through the top into the interior of the automobile and terminating in a finger ring for convenient actuation.

2. In a structure of the class described and in combination, an automobile body having a top provided with an opening and a transparent glass occupying the opening, an inclined mirror supported in the body and located below the rear portion of said glass, a mirror located in the body and forward of and opposite the first-named mirror to receive reflection therefrom, a longitudinally adjustable bracket connected with the top of the body at a point in front of said opening in the top and extending upwardly from the top, a third mirror carried by said bracket and disposed in line with the glass and the first-named mirror and adapted to cooperate therewith, and a shield also carried by said bracket and containing the third-named mirror.

ANTONE S. BORBA.
GEORGE T. EDWARDS.